United States Patent
Heidari et al.

(10) Patent No.: US 11,401,801 B2
(45) Date of Patent: Aug. 2, 2022

(54) SYSTEMS AND METHODS FOR REAL-TIME HYDRAULIC FRACTURE CONTROL

(71) Applicant: HALLIBURTON ENERGY SERVICES, INC., Houston, TX (US)

(72) Inventors: Peyman Heidari, College Station, TX (US); Harold Grayson Walters, Tomball, TX (US); Dwight David Fulton, Cypress, TX (US); Manisha Bhardwaj, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 233 days.

(21) Appl. No.: 16/581,813

(22) Filed: Sep. 25, 2019

(65) Prior Publication Data

US 2021/0087925 A1   Mar. 25, 2021

(51) Int. Cl.
*E21B 47/12*   (2012.01)
*G06N 20/00*   (2019.01)
*E21B 43/26*   (2006.01)

(52) U.S. Cl.
CPC .............. *E21B 47/12* (2013.01); *E21B 43/26* (2013.01); *G06N 20/00* (2019.01)

(58) Field of Classification Search
CPC .......... E21B 47/12; E21B 41/00; E21B 43/26; E21B 2200/22; G06N 20/00; G06N 3/0445; G06N 3/0454; G06N 3/088; G06N 3/003
See application file for complete search history.

(56) References Cited

U.S. PATENT DOCUMENTS

2017/0364795 A1* 12/2017 Anderson .............. G06N 20/10

FOREIGN PATENT DOCUMENTS

WO     2018117890 A1     6/2018

OTHER PUBLICATIONS

Asala et al., A Machine Learning Approach to Optimize Shale Gas Supply Chain Networks, Oct. 9-11, 2017, SPE Annual Technical Conference and Exhibition, San Antonio, Texas, 29 pp. (Year: 2017).*
Canadian Examination Report; Application No. 3,081,744, dated Jun. 29, 2021.

(Continued)

*Primary Examiner* — Toan M Le
(74) *Attorney, Agent, or Firm* — Novak Druce Carroll LLP

(57) ABSTRACT

Disclosed are systems and methods for receiving historical production data associated with at least one hydraulic fracturing well, receiving time-series data associated with the at least one hydraulic fracturing well, the time-series data representing at least one type of data, receiving non-temporal data associated with the at least one hydraulic fracturing well, generating a machine learning model based on the historical production data, the time-series data associated with the at least one hydraulic fracturing well and based on an original job design during a first stage of the job at a particular hydraulic fracturing well, and the non-temporal data, determining an optimized job design for the particular hydraulic fracturing well having an objective function using a prediction based on the machine learning model, and implementing the optimized job design for the particular hydraulic fracturing well.

20 Claims, 8 Drawing Sheets

(56) References Cited

OTHER PUBLICATIONS

Laptev, Nikolay et al., "Time-Series Extreme Event Forecasting with Neural Networks at Uber", ICML 2017 Time Series Workshop, Sydney, Australia.
H. I. Asala, et al.; "A Machine Learning Approach to Optimize Shale Gas Supply Chain Networks"; SPE-187361-MS; Society of Petroleum Engineers, 2017; 28 pages.
Second Canadian Examiner's Report for Canadian Application No. 3,081,744 dated Nov. 25, 2021, 4 pages.

\* cited by examiner

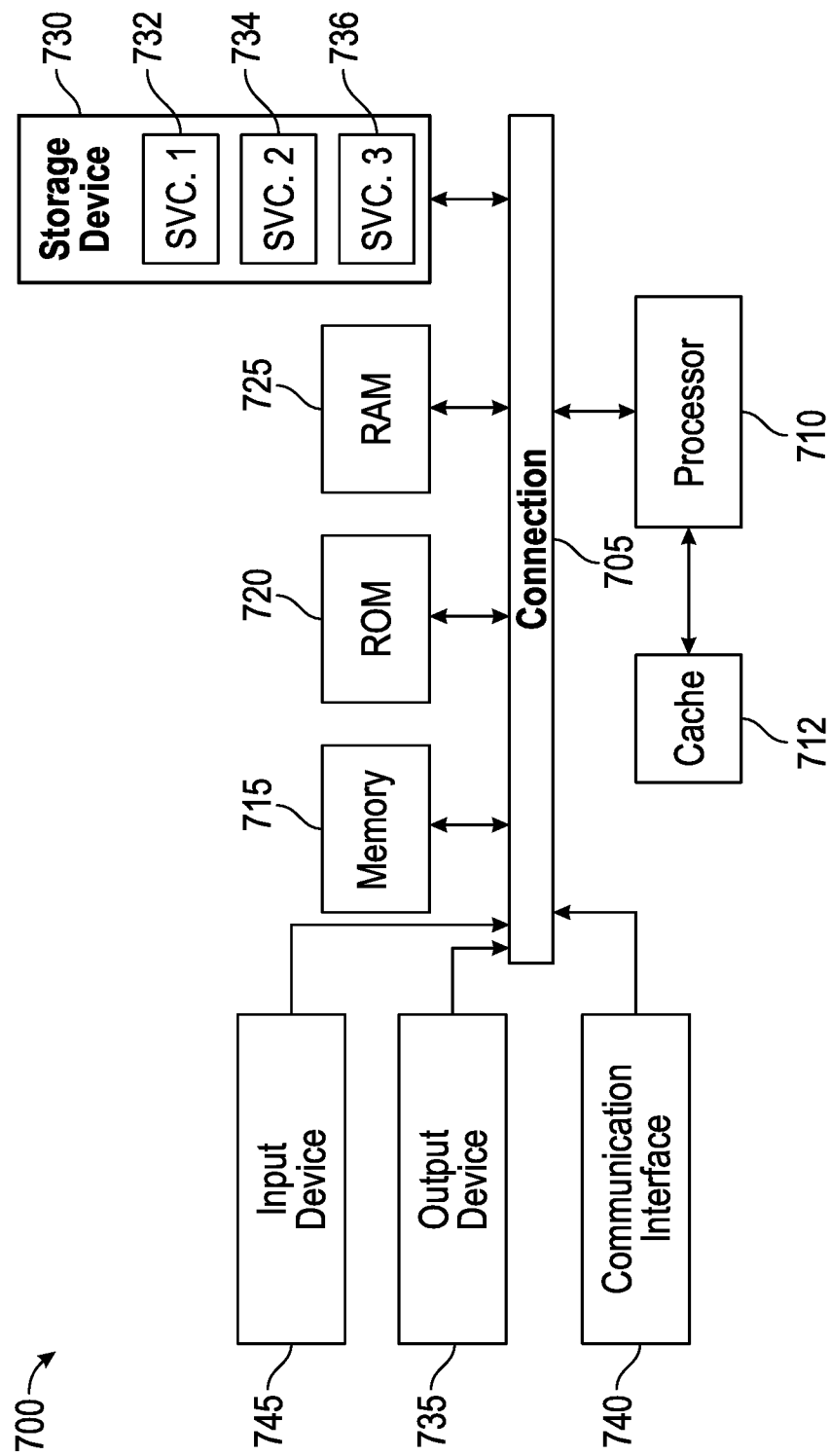

SYSTEMS AND METHODS FOR REAL-TIME HYDRAULIC FRACTURE CONTROL

TECHNICAL FIELD

The present technology pertains to real-time hydraulic fracture control and more specifically using historical information, time-series information, and well characteristics to build a machine learning model that is used to optimize a fracture job design.

BACKGROUND

A typical fracturing team may perform a hydraulic fracturing job based on a pre-designed job execution plan based on well characteristics, historical design considerations, fracture modeling, and location information. However, the real-time execution of a job does not follow the pre-designed job execution plan when unplanned events occur such as screen-outs, pressure-outs, shut-ins, and others. When these events occur, an on-location engineer makes decisions to control the job and fracture the well. However, these decisions are based on subjective approaches and decisions by engineers and crew members on location. The decisions may not result in optimal stimulation of the well.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 7 is a schematic diagram of an example computing device architecture, in accordance with some examples.

DETAILED DESCRIPTION

Figure 1A:
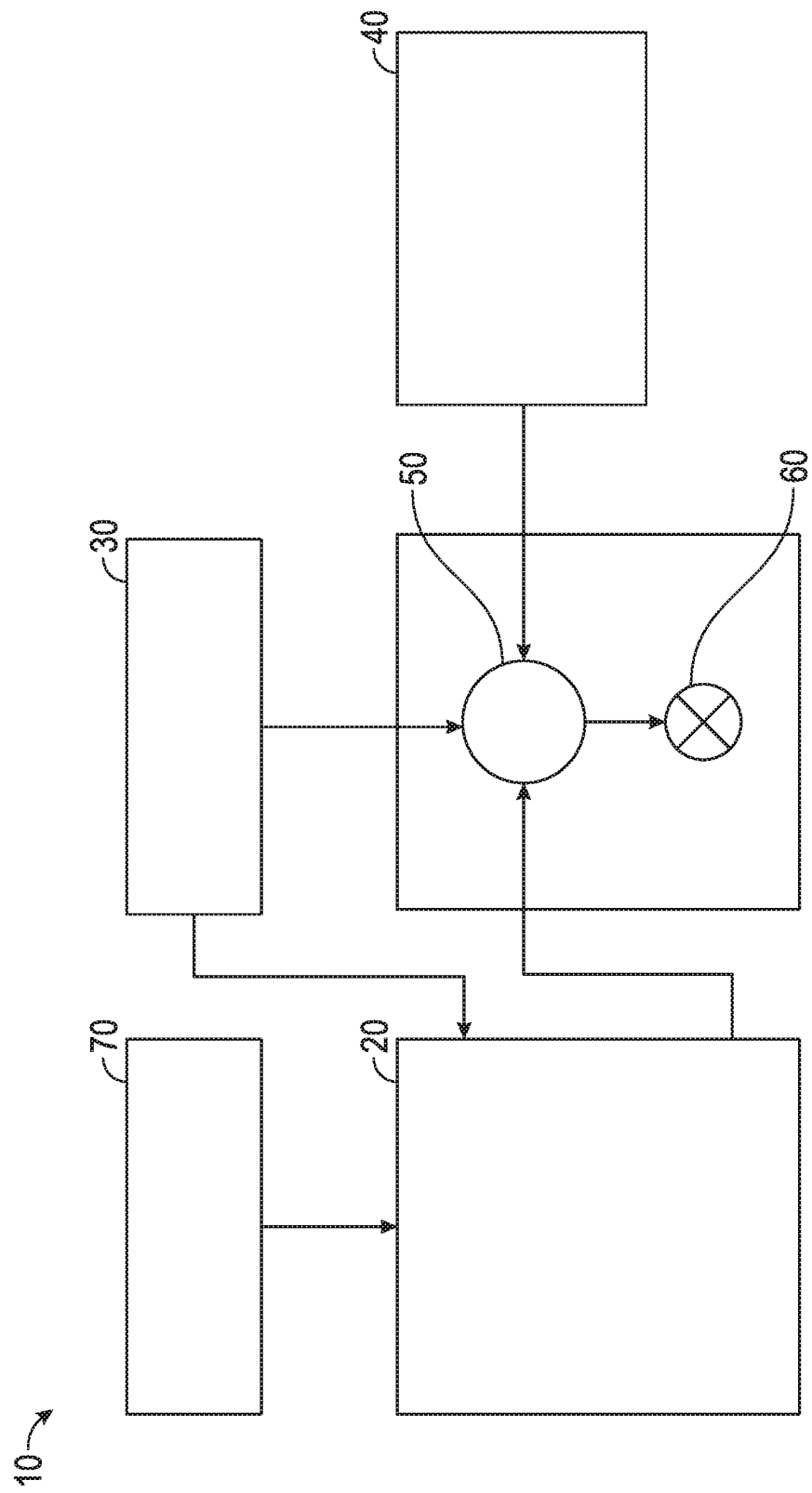
FIG. 1A is a schematic diagram of a fracturing system that may include a hydraulic fracturing job optimization system, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents. The various characteristics described in more detail below, will be readily apparent to those skilled in the art with the aid of this disclosure upon reading the following detailed description, and by referring to the accompanying drawings.

Disclosed herein are systems, methods, and computer-readable storage media for real-time hydraulic fracture control and using time-series information and well characteristics to build a machine learning model that is used to recommend job design changes. A hydraulic fracturing job optimization system may obtain and receive input data such as historical data associated with a plurality of wells and non-temporal data associated with the plurality of wells. In addition, the hydraulic fracturing job optimization system may receive time-series data associated with one or more parameters or variables for a particular well such as flow rate, proppant concentration, fluid concentration, chemical additive concentration, and pressure. The hydraulic fracturing job optimization system may use the input data to generate a machine learning model that can be used to predict and recommend real-time changes to an original job design to the particular well for fracture operations. The hydraulic fracturing job optimization system can generate a machine learning model for the particular hydraulic fracturing well based on the historical production data, the time-series data associated with the at least one hydraulic fracturing well and based on the original job design during a first stage of the job at the particular hydraulic fracturing well, and the non-temporal data. Next, the hydraulic fracturing job design optimization system can modify the original job design using an optimized job design for the particular hydraulic fracturing well having an objective function using a prediction based on the machine learning model. The objective function may be associated with improved key performance indicators such as production or financial costs. As a result, the hydraulic fracturing job design optimization system can implement the optimized job design for the particular hydraulic fracturing well for a second stage and subsequent stages of the job utilizing the first stage of the job at the particular hydraulic fracturing well.

In another example, the hydraulic fracturing job design optimization system can modify the existing job design for the particular hydraulic fracturing well at any stage after the first stage of the hydraulic fracturing job execution using an optimized job design having an objective function using a prediction based on the machine learning model and data from all previous stages of the job on the particular hydraulic fracturing well, and implement the newly optimized design for the current and subsequent stages of the job. In another example, the hydraulic fracturing job design optimization system can modify the existing job design for the particular hydraulic fracturing well at any given time during the hydraulic fracturing job execution, such as on a minute-by-minute or second-by-second basis, using an optimized job design having an objective function using a prediction based on the machine learning model and data from all previous times of the job on the particular hydraulic fracturing well, and implement the newly optimized design from the current time forward for the job execution.

The hydraulic fracturing job optimization system may modify at least one parameter for the job at the particular hydraulic fracturing well to improve the key performance indicators including making modifications to fracture fluid pump rate, a fluid type, a fluid volume per stage, proppant size, proppant mass per stage, maximum proppant concentration per stage, and proppant step rate or proppant ramp rate.

According to at least one aspect, an example method for optimizing a fracturing job design is provided. The method can include receiving, by at least one processor, historical production data associated with at least one hydraulic fracturing well, receiving, by the at least one processor, time-series data associated with the at least one hydraulic fracturing well and based on an original job design for a job at a particular hydraulic fracturing well, the time-series data representing at least one type of data for the particular hydraulic fracturing well, receiving, by the at least one processor, non-temporal data associated with the at least one hydraulic fracturing well, generating, by the at least one processor, a machine learning model based on the historical production data, the time-series data associated with the at least one hydraulic fracturing well and based on the original job design during a first stage of the job at the particular hydraulic fracturing well, and the non-temporal data, determining, by the at least one processor, an optimized job design for the particular hydraulic fracturing well having an objective function using a prediction based on the machine learning model, and implementing, by the at least one processor, the optimized job design for the particular hydraulic fracturing well.

According to at least one aspect, an example system for optimizing a fracturing job design is provided. The system can include at least one processor coupled with at least one computer-readable storage medium having stored therein instructions which, when executed by the at least one processor, causes the system to receive historical production data associated with at least one hydraulic fracturing well, receive time-series data associated with the at least one hydraulic fracturing well and based on an original job design for a job at a particular hydraulic fracturing well, the time-series data representing at least one type of data for the particular hydraulic fracturing well, receive non-temporal data associated with the at least one hydraulic fracturing well, generate a machine learning model based on the historical production data, the time-series data associated with the at least one hydraulic fracturing well and based on the original job design during a first stage of the job at the particular hydraulic fracturing well, and the non-temporal data, determine an optimized job design for the particular hydraulic fracturing well having an objective function using a prediction based on the machine learning model, and implement the optimized job design for the particular hydraulic fracturing well.

According to at least one aspect, an example non-transitory computer-readable storage medium for optimizing a fracturing job design is provided. The non-transitory computer-readable storage medium can include instructions which, when executed by one or more processors, cause the one or more processors to perform operations including receiving historical production data associated with at least one hydraulic fracturing well, receiving time-series data associated with the at least one hydraulic fracturing well and based on an original job design for a job at a particular hydraulic fracturing well, the time-series data representing at least one type of data for the particular hydraulic fracturing well, receiving non-temporal data associated with the at least one hydraulic fracturing well, generating a machine learning model based on the historical production data, the time-series data associated with the at least one hydraulic fracturing well and based on the original job design during a first stage of the job at the particular hydraulic fracturing well, and the non-temporal data, determining an optimized job design for the particular hydraulic fracturing well having an objective function using a prediction based on the machine learning model, and implementing the optimized job design for the particular hydraulic fracturing well.

Hydraulic fracturing has been widely applied to stimulate unconventional reservoirs. Hydraulic fracturing jobs have been conducted using a pre-designed job execution plan based on well characteristics, historical design considerations, fracture modeling, location information, and other information. However, the real-time execution of a hydraulic fracturing job does not necessarily follow the pre-designed job plan if unexpected events and issues occur such as screenouts, pressure outs, shut-ins, and others. Conventionally, on-location field engineers made decisions to control the job to successfully fracture or "frac" a well. However, these decisions could involve subjective decision making by engineers and crew members on location and may not result in optimal stimulation of the well.

For example, conventional pumping decisions during hydraulic fracturing operations are generally not governed by data and statistics. Many decisions are subjective to the subject matter expertise (SME) of the fracturing crew. The decision-making process typically has the objective of executing a pre-determined pumping schedule (such as pumping 100,000 pounds (lbs.) of proppant in 50,000 gallons (gal) of fluid at 75 barrels per minute (bpm) for each treatment) or reacting to catastrophic deviations from expected outcomes (such as lowering the flow rate or prematurely terminating a treatment during a pressure increase caused by a screenout). This fixed and reactive job execution approach does not optimize job results. It generally seeks to complete the job as designed, with little mechanism for accepting feedback during the job and modifying the design to enhance the outcome.

Some examples of stimulation features that could be used to optimize the well fracturing operations can include fluid type, fluid volume, additive type and concentration, proppant type, size, concentration, mass, and pumping rate. Additional features affecting well production include operator production practices and reservoir or spatial characteristics. The large number of features across numerous wells in a region, location, basin, or country presents the need for large scale complex mathematical and statistical modeling. The relationships and interactions between these and other additional features are not simple.

The information can be used to build a fracturing job design plan or to design an overall multi-well stimulation or production plan. Once a well site has been started, other models can be used to monitor the progress of the well development and provide insight into modifications or changes to the job design plan that can provide a benefit. The benefit can be decreasing the time frame to reach a production goal, decreasing the cost to develop and work the well during the development and production phases, increasing the projected barrel of oil equivalent (BOE) recovery, and other key performance indicators or measures (KPI).

The disclosure discussed herein can be used to provide a recommended hydraulic fracturing job design or design flow. The process includes building a machine learning or predictive model based on parameters or variables extracted from historical data. The historical data includes production data, time-series fracturing data, and fixed or non-temporal data from multiple wells. The historical data is split into three classes or groups, including training, validation and test, for building the model, evaluating model performance, and checking model predictive power, respectively. Methods or algorithms including Random Forest, Gradient Boost, Linear Regression, Ridge Regression, or Deep Learning can be used to build the machine learning model using encoded time-series data from Long Short-Term Memory (LSTM) encoder model and non-temporal fixed parameters to predict a KPI such as 6-month cumulative well production or 12-month cumulative well production. A pressure prediction model is also built using similar historical data that can be used on-location for real-time pressure prediction and can serve in monitoring KPI on-location.

For a stage of a well of interest, several candidate job designs are generated and passed through the machine learning models for KPI prediction. An optimization model is built based on input parameters, parameter constraints, and objective functions to minimize or maximize the designated KPI such as well production. The optimization model can be built using any of the optimization algorithms including genetic algorithm, exhaustive-search, differential evolution, and pattern search, among others. The optimization model uses predictions generated from the machine learning model for each of the candidate job designs for optimization purposes and recommends a job design that satisfies the constraints. The recommended job design can balance a maximization of production and minimization of cost and can be optimized for cost, short term production outputs, long term production outputs, and other KPIs. The job design can be utilized by well engineers and operators and by well site equipment including computing devices.

The systematic and data-driven approach used by the system discussed herein may limit a need for subjective and ad-hoc decision making associated with the fracturing job design to enable a persistent process to guide on-location and real-time decisions for the fracturing operations. The approach may make use of real-time data including one-second information collected during fracturing operation including pressure data, pumping rate data, digital acoustic sensing (DAS) data, digital temperature sensing (DTS) data, or digital strain sensing (DSS) data.

The solutions discussed herein may use a data-driven mathematical and statistical model based on time-series data to predict and optimize fracturing jobs in real-time by performing operations that optimize key performance indicators including, but not limited to maximizing well production, stimulated reservoir volume, NPV, minimizing job time, or minimizing cost. Use of the model to predict and optimize a fracturing job may eliminate or reduce ad-hoc decision making during the fracturing job. As an example, the model may be based on fracturing job time-series data having variables associated with slurry rate, proppant concentration, treating pressure, and others. In addition, the model may be based on additional well characteristics associated with non-temporal, fixed data including well location information including latitude and longitude, true vertical depth (TVD), measured depth (MD), reservoir information, completion parameters (e.g., lateral length, stage spacing, perforation cluster spacing, number of treatments), instantaneous shut-in pressure (ISIP), fracture gradient, among other data. The mathematical and statistical model may be a machine learning model based on LSTM that uses both the time-series data and the non-temporal data. The model may be used to predict and track KPIs of the well in real-time during the fracturing job and provide recommendations to optimize the KPIs for the fracturing job. An alternative approach may be based on two or more machine learning models including one model based on time-series data and another model using fixed non-temporal data. The two models can be combined using an additional machine learning model, a statistical model, a physics based approach, or a combination of these approaches, among other possibilities.

The machine learning model may utilize big data associated with a plurality of wells including one-second detailed time-series fracture pumping information from historical fracturing jobs in a basin or area in addition to publicly available data. As a result, the machine learning model may be used to provide a scalable and systematic approach to predict and recommend real-time changes for fracture operations on location. The model may be based on multiple data input sources that may be encoded together or an individual input data source that may be combined with other engineered or constant features.

The system may leverage time-series information and well characteristics to build a large-scale data-driven statistical model to predict KPI in real-time on location and recommend job design changes that optimize the KPI. The model may use time-series fracture pumping data and other well information such as location data, reservoir data, and completion parameters. Historical data from a plurality of wells may be used to train the model and real-time predictions may be made on-location for a proposed well location or a particular well. The large-scale, real-time model may use deep learning, random forest, gradient boost, or other machine learning models and/or Bayesian modeling.

In a first step, the system may perform production data processing or proxy processing by obtaining historical production data. Next, the system may process and clean the production data. A type curve may be used to fit the production data using the Arps method and equation to reduce noise in the production data, overcome production reporting issues, and estimate production values per well. J. J. Arps developed decline analysis equations that may be used to plot time or rate versus production of a well. A key component of the modeling workflow is a target or response variable for well productivity.

Depending on a region, production data may have limited public availability or may not be trustworthy. As an example, lease-well production is available in Texas but well level resolution is limited or unavailable. As a result, production data may be processed and cleaned before it may be used for modeling workflow. The production data may be processed using a number of quality checks to ensure production data quality. Next, type-curve and smoothing methods may be applied to the data to reduce noise and correct for erroneous production data. In addition, wells may have production data that is not usable and it is removed. A target variable such as 90-day cumulative production, 180-day cumulative production, or 365-day cumulative production, or maximum initial production may be determined using the smoothed or fitted data. However, production data may not be available in real-time and an alternative KPI or proxy may be available such as an engineered feature, e.g., cluster flow distribution or well interference may be used in place or along with production data for real-time optimization.

In a next step, the system may perform time-series data processing. The time-series data may be surface or downhole pumping data or other sensor data such as digital acoustic sensing (DAS) data, digital temperature sensing (DTS) data, or digital strain sensing (DSS) data. The surface or downhole pumping data may be collected over a number of minutes, hours, or days and may be obtained at various frequencies such as 1 Hz or 1000 Hz and processed to improve significance and applicability of the data. As an example, the DAS data, the DTS data, or the DSS data may be processed using Fast Fourier Transform (FFT), Wavelet analysis, filters or other processing techniques. The time-series data across different stages of a well or from a plurality of wells is associated with a variety of different jobs and may have a variable size for each job based on the length of the job. As a result, the time-series data may be processed and down-sampled or up-sampled to a pre-determined sample density. In addition, the time-series data may be processed to address differences between surface and bottom-hole values. Further processing may include scaling, standardization, and normalization of variables in a certain range based on the modeling method used.

In a next step, the system may obtain non-temporal data and process the non-temporal data. The non-temporal data may be associated with information that remains fixed or constant for a particular well such as a location of a well, e.g., latitude and longitude of a well, true vertical depth of a well (TVD), measured depth of a well (MD), an orientation of the well, geology associated with the well, and other non-temporal data. The system also may obtain pressure data associated with an initial treatment of a well (e.g., stage one) and process the pressure data.

The historical production data, time-series data including job design time-series data and pressure time-series data, and non-temporal data may be combined together into a single dataset and used to build a data analytics or machine learning model. The dataset may be divided into three separate categories including a training dataset, a validation dataset, and a test dataset. The training dataset may be used to build a machine learning model, the validation dataset may be used to evaluate the trained model's performance and assess machine learning algorithms, and the test dataset may be used to ensure robustness of the machine learning model and predictive power of the machine learning model. The data may be divided into subsets including the training dataset, the validation dataset, and the test dataset using a random partition selection or using a clustering algorithm based on a variable such as location. The training dataset, the validation dataset, and the test dataset may be used to develop the machine learning model to predict well production and/or another KPI.

The time-series data associated with different variables such as flow rate, proppant concentration, fluid concentration, chemical additive concentration, and pressure may be encoded using an LSTM encoder. The time-series data may also be processed using time-window averaging, and domain transformation (frequency-time), among others. The time-series data associated with the different variables may be encoded together or may be encoded separately as time-series data that represents an individual variable. The encoded time-series data may be an array and may be combined with the non-temporal data as input to a machine learning model. The machine learning model may use a variety of different algorithms including one or more of linear regression, lasso, ridge regression, random forest, gradient boosting, and/or deep learning.

Using the machine learning model, the system may generate a real-time design optimization model. The system may optimize a pre-defined objective function such as one or more of maximizing well production and/or minimizing cost. More particularly, the pre-defined objective function may include one or more of maximizing cumulative BOE for a first six months of production, maximizing cumulative oil production for a first nine months, minimizing cumulative water-oil ratio averaged over months three through nine, minimizing gas production decline rate in a first twelve months, minimizing gas-oil ratio (GOR) at twelve months, minimizing a fracture job financial cost, maximizing a five-year well NPV, and maximizing a twelve month cumulative BOE per dollar of fracturing job cost, among others.

When building the optimization model, a number of features or parameters having time-series variables may be selected for optimization. The features/parameters may be pre-defined and/or user selected including a fracture fluid pump rate, a fluid type, a fluid volume per stage, proppant size, proppant mass per stage, maximum proppant concentration per stage, and proppant step or ramp rate, among others.

Pre-defined and/or custom constraints that are defined by a user may be provided that the real-time design optimization model uses. The constraints may be limits or bounds within which the model may vary the features/parameters to optimize the pre-defined objective function. The constraints may include a fracture pumping rate between 60 and 80 barrels per minute (bpm), fluid type of slickwater, fluid type of friction-reduced water, fluid volume per stage between 30,000 gallons and 50,000 gallons, proppant size either 40/70 or 100 mesh, proppant mass per stage within +/−10% of design amount, fracture job financial cost less than $3.25 million (e.g., when optimizing six month cumulative BOE), and total pump time of less than three hours (which implies constraints to rate and volume), among others. As an example, the constraints may be set by a user based on customer preference (e.g., a desired fluid type or a desired proppant mass) or by limitations of what is available on location during the job (e.g., only 40/70 and 100 mesh proppant are on location and no 30/50 is available), or by a financial strategy (e.g., keeping a job financial cost under a particular limit or cap).

An optimization algorithm may be applied to the list of features within the provided constraints to generate multiple iterations and scenarios to optimize the pre-defined objective function. As an example, the optimization algorithm may be a genetic algorithm, pattern search, differential evolution, or another algorithm. For each scenario of a number of scenarios for the fracturing job, the data may be prepared and processed. The time-series data may be encoded and combined with the non-temporal data to determine KPI such as a production prediction and determine a pressure prediction for each scenario.

Based on the objective function (e.g., maximizing production), a most optimal scenario (e.g., a pumping schedule) given the constraints from a pool of top scenarios for a next stage and treatment may be recommended in real-time for a hydraulic fracturing job. As an example, the real-time design optimization model may recommend a change in proppant concentration from a first treatment to a second treatment based on real-time data collected on the location during the job. User input may be provided during development of the model and the real-time design optimization model may provide automated recommendations without user input/feedback once the model is deployed on the job in the field. As an example, for one or more specific objective functions and within the constraints, there may be a wide range of objective function results based on changes and variations in features/parameters. Job designs may be sorted by the real-time design optimization model that may range from lower values for the objective function to higher values for the objective function. There may be one scenario that provides a best result or a highest objective function or there may be more than one scenario that provides a best result or highest objective function. The hydraulic fracturing job optimization system may display a graph or a representation of each scenario that may show the features/parameters over time. A user such as an operations engineer may view the scenarios and select one to modify the fracturing job for a next stage in the job. Alternatively, the scenario may be automatically selected and implemented.

As follows, the disclosure will provide a more detailed description of the systems, methods, computer-readable media and techniques herein for optimizing a fracture job design. The disclosure will begin with a description of example systems and environments, as shown in FIGS. 1A through 5. A description of example methods and technologies for optimizing a fracture job design, as shown in FIG. 6, will then follow. The disclosure concludes with a description of an example computing system architecture, as shown in FIG. 7, which can be implemented for performing computing operations and functions disclosed herein. These variations shall be described herein as the various embodiments are set forth. The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1A, the disclosed methods and compositions may directly or indirectly affect one or more components or pieces of equipment associated with an exemplary wellbore operating environment 10, or exemplary fracturing system, according to one or more embodiments. In certain instances, the wellbore operating environment 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, diverting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 1B:
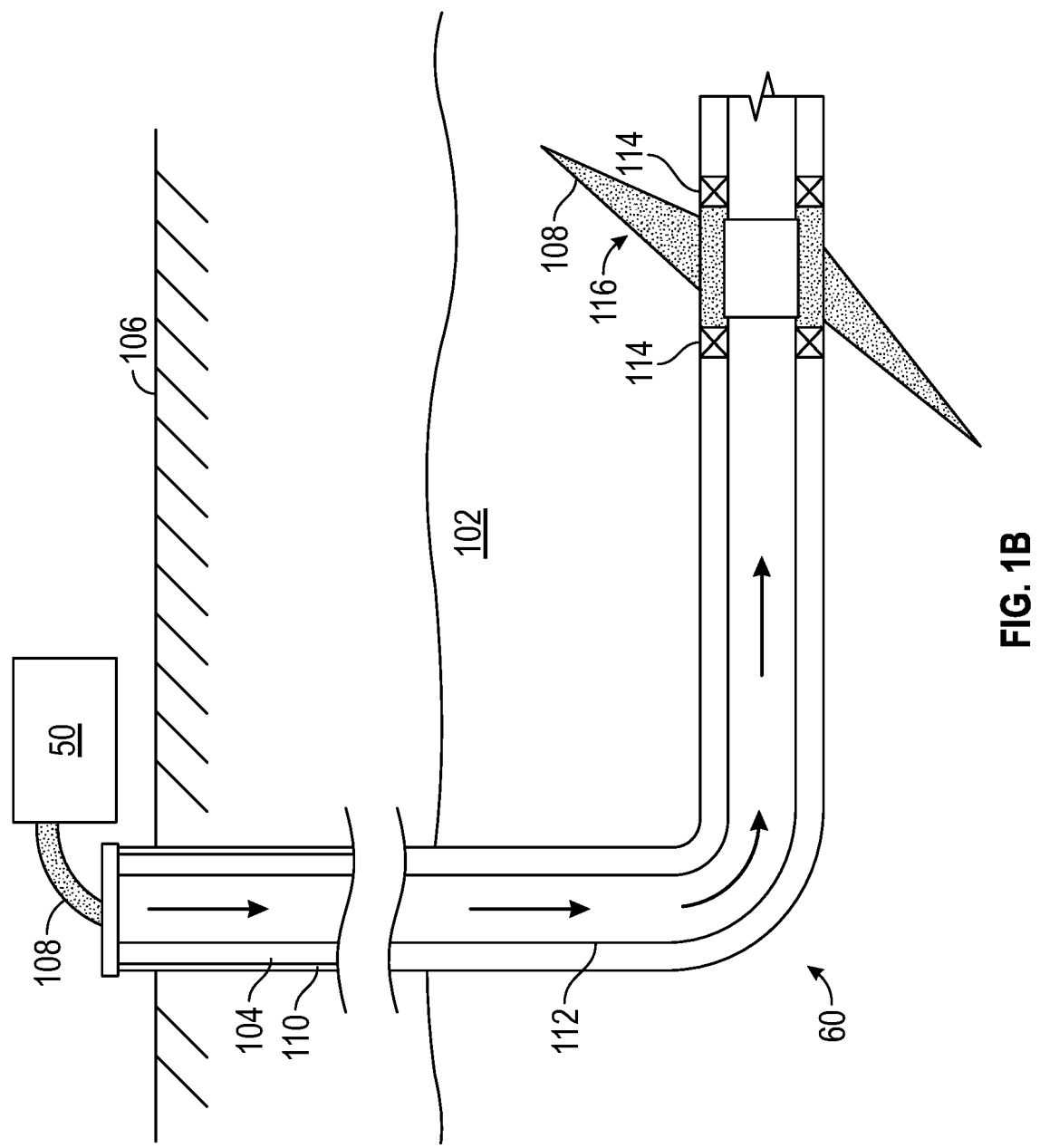
FIG. 1B is a diagram illustrating an example of a subterranean formation in which a fracturing operation may be performed, in accordance with some examples.

FIG. 1B shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 extending from the surface 106 into the well bore 104. The pump and blender system 50 is coupled a work string 112 to pump the fracturing fluid 108 into the well bore 104. The work string 112 may include coiled tubing, jointed pipe, the well casing 110, and/or other structures that allow fluid to flow into the well bore 104. The work string 112 can include flow control devices, bypass valves, ports, and or other tools or well devices that control a flow of fluid from the interior of the work string 112 into the subterranean zone 102. For example, the work string 112 may include ports adjacent the well bore wall to communicate the fracturing fluid 108 directly into the subterranean formation 102, and/or the work string 112 may include ports that are spaced apart from the well bore wall to communicate the fracturing fluid 108 into an annulus in the well bore between the working string 112 and the well bore wall.

The work string 112 and/or the well bore 104 may include one or more sets of packers 114 that seal the annulus between the work string 112 and well bore 104 to define an interval of the well bore 104 into which the fracturing fluid 108 will be pumped. FIG. 1B shows two packers 114, one defining an uphole boundary of the interval and one defining the downhole end of the interval. When the fracturing fluid 108 is introduced into well bore 104 (e.g., in FIG. 1B, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the wellbore operating environment 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure, temperature, volumetric rate, mass, and density), gauges, and/or combinations thereof, and the like.

Disclosed herein are systems and methods for optimizing a fracture job design. A hydraulic fracturing job optimization system may obtain and/or receive input data including historical well data, non-temporal data associated with a well, and time-series data associated with a well. The hydraulic fracturing job optimization system may use the input data to generate a machine learning model and use the machine learning model to predict and recommend changes to a hydraulic fracturing job at the well in real-time.

Figure 2:
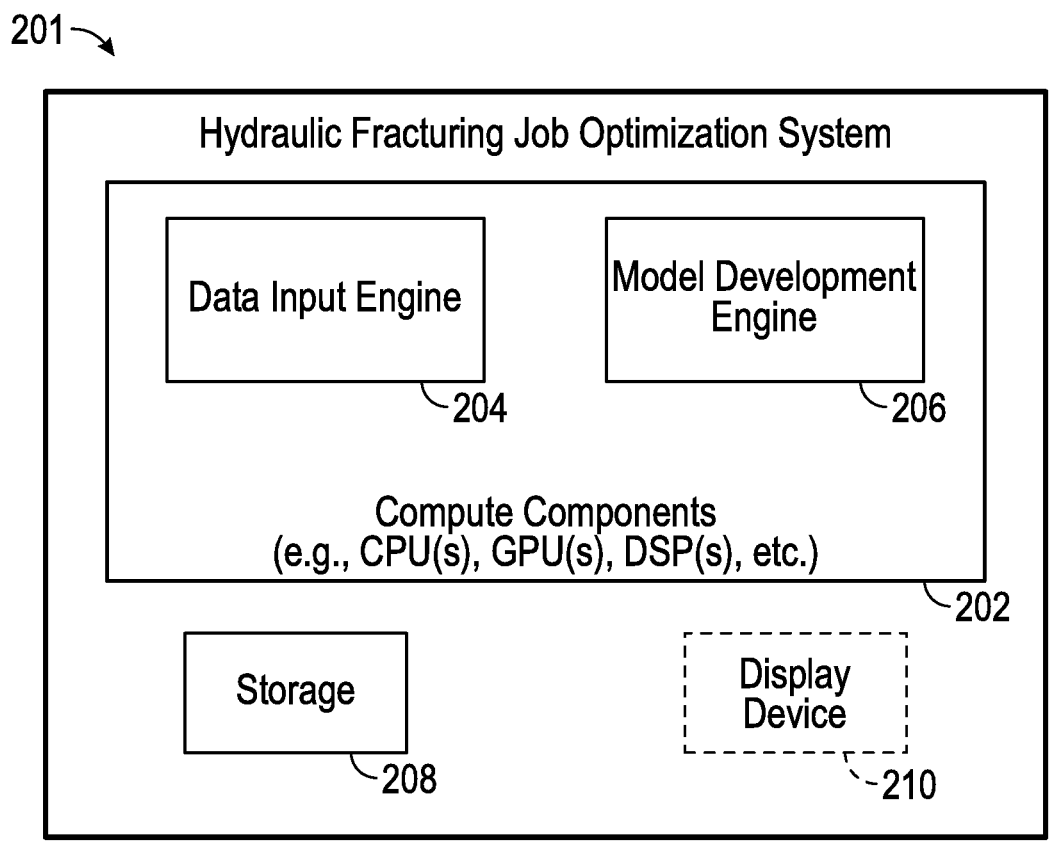
FIG. 2 is a block diagram of the hydraulic fracturing job optimization system that may be implemented to optimize a fracture job design, in accordance with some examples.

FIG. 2 illustrates a hydraulic fracturing job optimization system 201 according to an example. The hydraulic fracturing job optimization system 201 can be implemented for optimizing a fracture job design using a machine learning model as described herein. In this example, the hydraulic fracturing job optimization system 201 can include compute components 202, a data input engine 204, a model development engine 206, and a storage 208. In some implementations, the hydraulic fracturing job optimization system 201 can also include a display device 210 for displaying data and graphical elements such as images, videos, text, simulations, and any other media or data content.

The hydraulic fracturing job optimization system 201 may be physically located at the wellbore operating environment 10. Components of the hydraulic fracturing job optimization system 201 may be located downhole and/or on the surface. In addition, the hydraulic fracturing job optimization system 201 may be executed by a computing device such as compute components 202 located downhole and/or on the surface. In one example, the hydraulic fracturing job optimization system 201 may be executed by one or more server computing devices such as a cloud computing device in communication with the hydraulic fracturing job optimization system 201.

The hydraulic fracturing job optimization system 201 can be part of, or implemented by, one or more computing devices, such as one or more servers, one or more personal computers, one or more processors, one or more mobile devices (for example, a smartphone, a camera, a laptop computer, a tablet computer, a smart device, etc.), and/or any other suitable electronic devices. In some cases, the one or more computing devices that include or implement the hydraulic fracturing job optimization system 201 can include one or more hardware components such as, for example, one or more wireless transceivers, one or more input devices, one or more output devices (for example, display device 210), the one or more sensors (for example, an image sensor, a temperature sensor, a pressure sensor, an altitude sensor, a proximity sensor, an inertial measurement unit, etc.), one or more storage devices (for example, storage system 208), one or more processing devices (for example, compute components 202), etc.

As previously mentioned, the hydraulic fracturing job optimization system 201 can include compute components 202. The compute components can be used to implement the data input engine 204, the model development engine 206, and/or any other computing component. The compute components 202 can also be used to control, communicate with, and/or interact with the storage 208 and/or the display device 210. The compute components 202 can include electronic circuits and/or other electronic hardware, such as, for example and without limitation, one or more programmable electronic circuits. For example, the compute components 202 can include one or more microprocessors, one or more graphics processing units (GPUs), one or more digital signal processors (DSPs), one or more central processing units (CPUs), one or more image signal processors (ISPs), and/or any other suitable electronic circuits and/or hardware. Moreover, the compute components 202 can include and/or can be implemented using computer software, firmware, or any combination thereof, to perform the various operations described herein.

The data input engine 204 can be used to obtain data, process data, analyze data, and store data in one or more databases. The databases may be stored in the storage 208 or in another location.

As an example, the data input engine 204 may receive oil field data such as data associated with one or more oil fields located in the same or other areas. The data may be historical data such as historical production data. A type curve may be fit to the historical data to reduce noise in the production data, overcome production reporting issues, and estimate production values per well. However, in certain cases, the historical data may have limited availability because it is not publicly available or it may not be trustworthy. In these cases, the production data may have to be processed and cleaned by the data input engine 204 before it can be used. A series of quality checks may be applied by the data input engine 204 and then type-curve and/or smoothing methods may be applied to the historical data to reduce noise and correct for errors in the production data. The quality checks also may be used to determine that production data associated with one or more wells is unusable and should be removed from the dataset. An appropriate target variable such as 90 day, 180 day, or 365 cumulative production or maximum initial production may be determined using the smoothed, fit data. The production target variable may be used by the data input engine 204 and provided to the model development engine 206. Alternatively, a different KPI or proxy data may be used in place of production data. As an example, cluster flow distribution data or well interference data could be used instead of production data and/or in combination with the production data.

Next, the data input engine 204 may obtain and process time-series data including surface data, downhole pumping data, or other sensor data such as DAS data, DTS data, or DSS data. The data may be obtained at one or more frequencies including 1 Hz or 1000 Hz. The data input engine 204 may process the time-series data to improve the data by running the data through a Fast Fourier Transform (FFT), Wavelet analysis, filters, or other processing. The processed time-series data may be used in place of or in addition to the regular data by the data input engine 204. The time-series data may be data that spans a period of time such as minutes, hours, or days. Because the time-series data across different jobs may be of variable length, the time-series data may be processed and down-sampled or up-sampled by the data input engine 204 to a pre-determined sample density. In addition, the data input engine 204 may perform shifting of the time-series data to account for differences between surface values and bottom-hole values. The data input engine 204 may also perform scaling, standardization, and/or normalization of variables in a particular range based on a modeling method used. As a result, the data associated with the time-series data up to a time t may be used to build the machine learning model and provide predictions and estimates for a job at a later point in time such as t+1 or T where T is greater than t.

The data input engine 204 also may receive and/or obtain non-temporal data associated with one or more wells such as data that may be constant including location data associated with the well including latitude, longitude, true vertical depth (TVD), and measured depth (MD), among other fixed information.

The data input engine 204 may combine the historical production data, the time-series data, and the non-temporal data into a single dataset that may be used to build a machine learning model by the model development engine 206. The data in the dataset may be divided into different classes or subsets including training data, validation data, and test data, among others. The training data subset may be used to build the machine learning model, the validation data subset may be used to evaluate performance of the trained machine learning model and assess different machine learning algorithms, and the test data subset may be used to ensure the robustness of the machine learning model and its predictions. The data subsets may be selected using a random partition selection and/or using a cluster algorithm. The machine learning model may be used to develop a real-time design optimization model that may be used to predict well production or another KPI using a two-step process.

An LSTM autoencoder may take the time-series data associated with multiple sources or variables such as flow rate, proppant concentration, fluid concentration, and pressure and may encode the data using the LSTM encoder. Each set of data may be encoded individually or the data may be encoded as a whole. Next, the encoded time-series data (e.g., an array) may be used along with the historical data and the non-temporal data as input in a machine learning model. The machine learning model may be generated using linear regression, lasso, ridge regression, random forest, gradient boosting, and deep learning, among others.

The model development engine 206 may be used by a real-time design optimization model to optimize a job design for a hydraulic fracturing well to improve or optimize a pre-defined objective function such as maximizing well production or minimizing cost. A list of features or variables that may have time-series data may be selected to optimize. Based on constraints associated with the features or variable, the real-time design optimization model may generate one or more iterations and scenarios to optimize the pre-defined objection function. Each scenario may include one or more changes to the features or variables such as a change in an amount of proppant used during a stage, a change in a fluid volume used during the stage, a change in a maximum rate during the stage, and/or a change in a maximum proppant concentration during the stage. The stage may be a next stage in the fracturing of the well. The real-time design optimization model may select a best design to improve or optimize the pre-defined objective function that meets the constraints and implement the one or more changes in a next stage. As a result, the real-time design optimization model may make the changes and provide the recommendations without user input or feedback once it is deployed or implemented for the job.

The storage 208 can be any storage device(s) for storing data. In some examples, the storage 208 can include a buffer or cache for storing data for processing by the compute components 202. Moreover, the storage 208 can store data from any of the components of the hydraulic fracturing job optimization system 201. For example, the storage 208 can store input data used by the hydraulic fracturing job optimization system 201, outputs or results generated by the hydraulic fracturing job optimization system 201 (for example, data and/or calculations from the data input engine 204, the model development engine 206, etc.), user preferences, parameters and configurations, data logs, documents, software, media items, GUI content, and/or any other data and content.

While the hydraulic fracturing job optimization system 201 is shown in FIG. 2 to include certain components, one of ordinary skill in the art will appreciate that the hydraulic fracturing job optimization system 201 can include more or fewer components than those shown in FIG. 2. For example, the hydraulic fracturing job optimization system 201 can also include one or more memory components (for example, one or more RAMs, ROMs, caches, buffers, and/or the like), one or more input components, one or more output components, one or more processing devices, and/or one or more hardware components that are not shown in FIG. 2.

Figure 3:
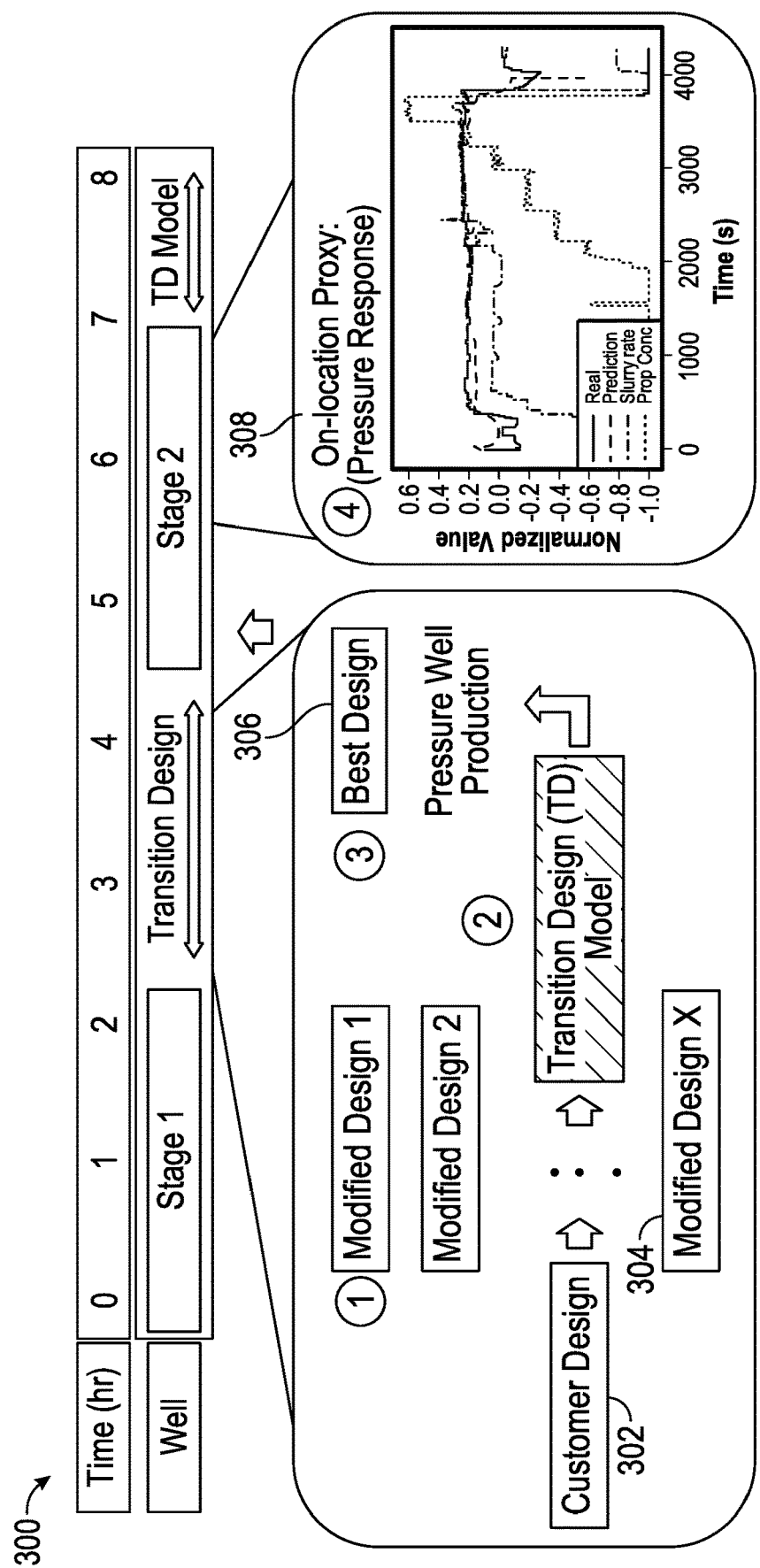
FIG. 3 is a flow diagram for the hydraulic fracturing job optimization system, in accordance with some examples.

FIG. 3 illustrates a flow diagram for the hydraulic fracturing job optimization system 201 according to an example. FIG. 3 shows an example hydraulic fracturing well that has an initial customer design 302 for a job at the hydraulic fracturing well. The initial customer design may be provided via an input file that is a compressed binary file provided to the hydraulic fracturing job optimization system. The job proceeds according to the initial customer design during stage one, which is shown as just over two hours. At a time between the first and the second stage, the hydraulic fracturing job optimization system 201 may obtain data during the first stage and use this data and the job plan for a next stage to generate one or more modified job designs 304. The hydraulic fracturing job optimization system 201 may determine one or more best designs from the list of modified job designs and select one best design 306 to use in a next stage, e.g., stage two. The best design may have a best or optimized prediction associated with one or more objective functions. The one or more objective functions may be maximizing cumulative barrel of oil equivalent (BOE) for a first six months of production, maximizing cumulative oil production for a first nine months, minimizing cumulative water-oil ratio averaged over months three through nine, minimizing gas production decline rate in a first twelve months, minimizing gas-oil ratio (GOR) at twelve months, minimizing a job financial cost, maximizing a five-year well net present value (NPV), and maximizing a twelve month cumulative BOE per dollar of job cost. The best design may modify one or more variables or parameters including for the job at the particular hydraulic fracturing well, the at least one parameter comprising a fracture fluid pump rate, a fluid type, a fluid volume per stage, proppant size, proppant mass per stage, maximum proppant concentration per stage, and proppant step rate or proppant ramp rate.

However, the modification of the one or more variables or parameters has to be according to one or more constraints such as a fracture pumping rate between 60 and 80 barrels per minute (bpm), fluid type of slickwater, fluid type of friction-reduced water, fluid volume per stage between 30,000 gallons and 50,000 gallons, proppant size either 40/70 or 100 mesh, proppant mass per stage within +/−10% of design amount, fracture job financial cost less than $3.25 million (e.g., when optimizing six month cumulative BOE), and total pump time of less than three hours (which implies constraints to rate and volume), among others. As an example, the constraints may be set by a user based on customer preference (e.g., a desired fluid type or a desired proppant mass) or by limitations of what is available on location during the job (e.g., only 40/70 and 100 mesh proppant are on location and no 30/50 is available), or by a financial strategy (e.g., keeping a job financial cost under a particular limit or cap).

At points during the job (e.g., after or before each stage) the hydraulic fracturing job optimization system 201 may write data to a storage file including design information, metadata associated with the job, summary data (e.g., stage-level data), time-based data, and other information.

FIG. 3 shows a graph 308 that illustrates a model prediction for pressure for the second stage, actual pressure for the second stage, a slurry rate for the second stage, and a proppant concentration for the second stage. If a KPI is not available in real-time on-location such as six-month cumulative BOE, on-location pressure can be used as a proxy response variable. The actual observed pressure on second stage can be monitored against model predicted pressure. An agreement between the actual observed pressure and the model predicted pressure can indicate model performance and predictive capability.

The hydraulic fracturing job design optimization system 201 may obtain data during the second stage and use the data from the first stage and the second stage to generate one or more modified job designs. The hydraulic fracturing job optimization system 201 may determine one or more best designs from the list of modified job designs and select one best design 306 to use in a next stage, e.g., stage three.

In other words, after the second stage, the hydraulic fracturing job optimization system may again determine one or more modified job designs 304. The hydraulic fracturing job optimizations system 201 may determine one or more best designs from the list of modified job designs and select one best design to use in a next stage, e.g., stage three and so on. This process may continue until the last stage of the well and at each stage the machine learning model may use the data from the previous stages.

Figure 4:
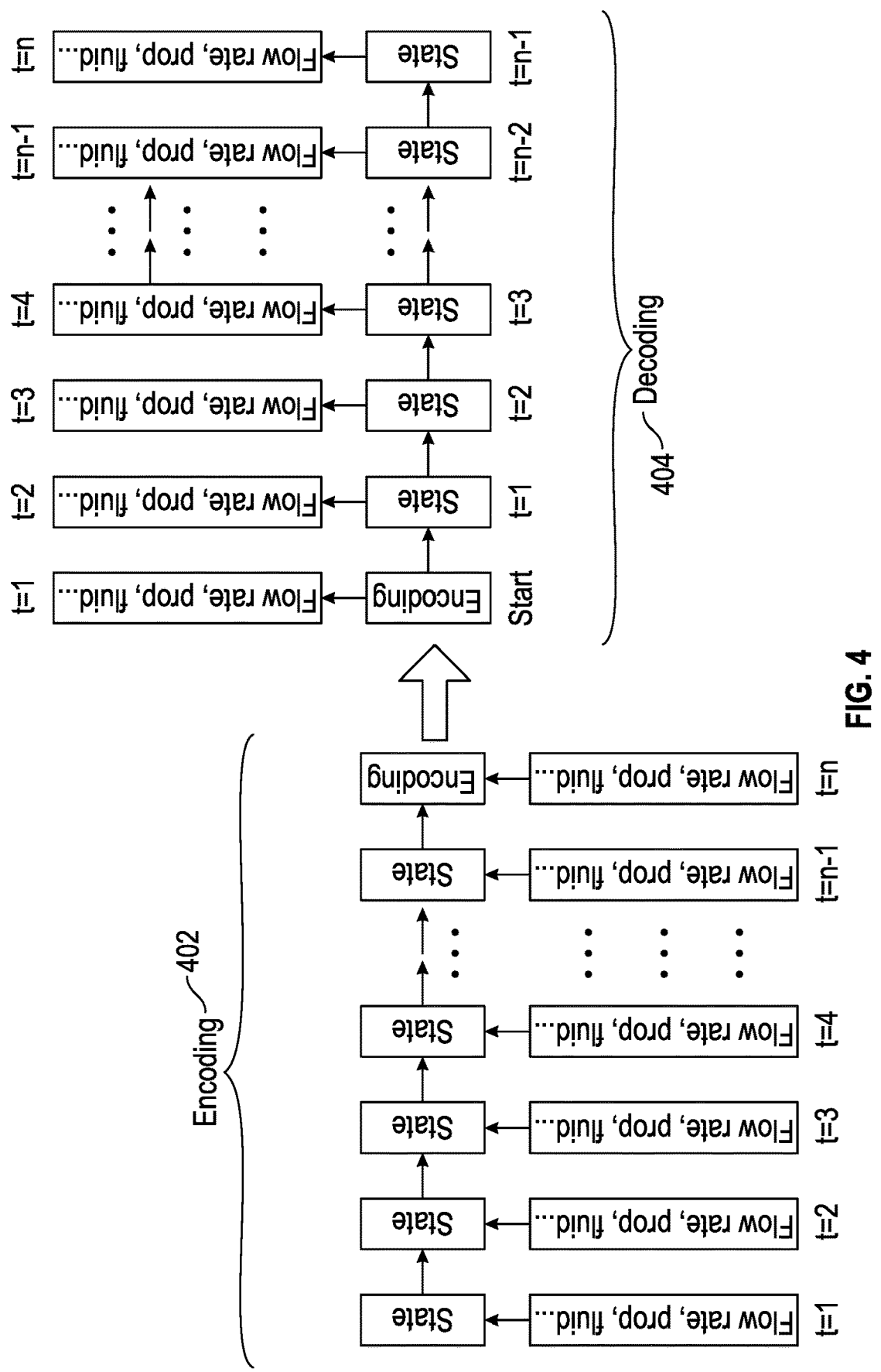
FIG. 4 shows a diagram of time-series data used for machine learning model building for the hydraulic fracturing job optimization system, in accordance with some examples.

FIG. 4 shows a diagram of time-series data used for machine learning model building for the hydraulic fracturing job optimization system 201 according to an example. As shown in FIG. 4, the historical production data, the time-series data, and the non-temporal data may be used to generate the machine learning model. The time-series data may be obtained and received from a first time when time equals one until time equals n and encoded. The time-series data may be from multiple sources and different types of data associated with a hydraulic fracturing well including flow rate data, proppant concentration data, fluid concentration data, chemical additive concentration data, and pressure data, among others. The time-series data at time t=1 may include an array or sequence of data that represents flow rate at time=1, proppant concentration at t=1, fluid concentration data at t=1, chemical additive concentration at t=1, and pressure at t=1. The input data sequence may be converted into a state vector. The time-series data at time t=2 may include an array that represents flow rate at time=2, proppant concentration at t=2, fluid concentration data at t=2, chemical additive concentration at t=2, and pressure at t=2, and so on. Each type of data may be encoded separately using a LSTM encoder. Alternatively, the data may be combined together and encoded using the LSTM encoder. This is shown in 402. The encoding represents the time-series data. The encoded data may be decoded in 404 to retrieve the original time-series data.

The encoded time-series data may be combined with the non-temporal data and the historical data as input to a machine learning model. The machine learning model may be based on one or more algorithms including linear regression, lasso, ridge regression, random forest, gradient boosting, and deep learning.

Alternatively, the machine learning may be based on Gated Recurrent Units (GRU) in place of the LSTM autoencoder. As another example, the machine learning may be based on convolutional neural networks (CNN) instead of recurrent neural networks (RNN) such as GRU or LSTM.

Figure 5:
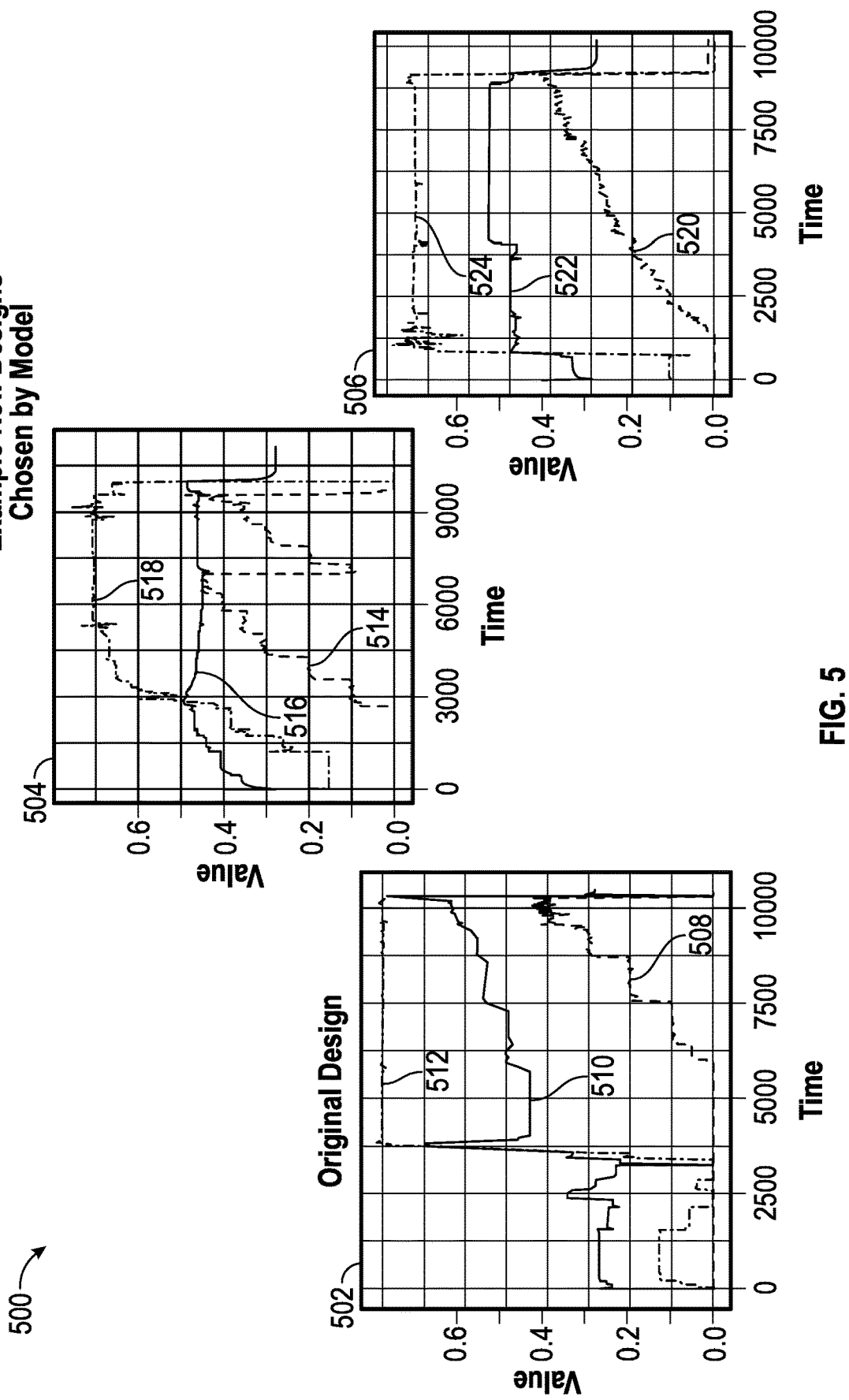
FIG. 5 shows graphs associated with hydraulic fracturing job designs, in accordance with some examples.
Figure 6:
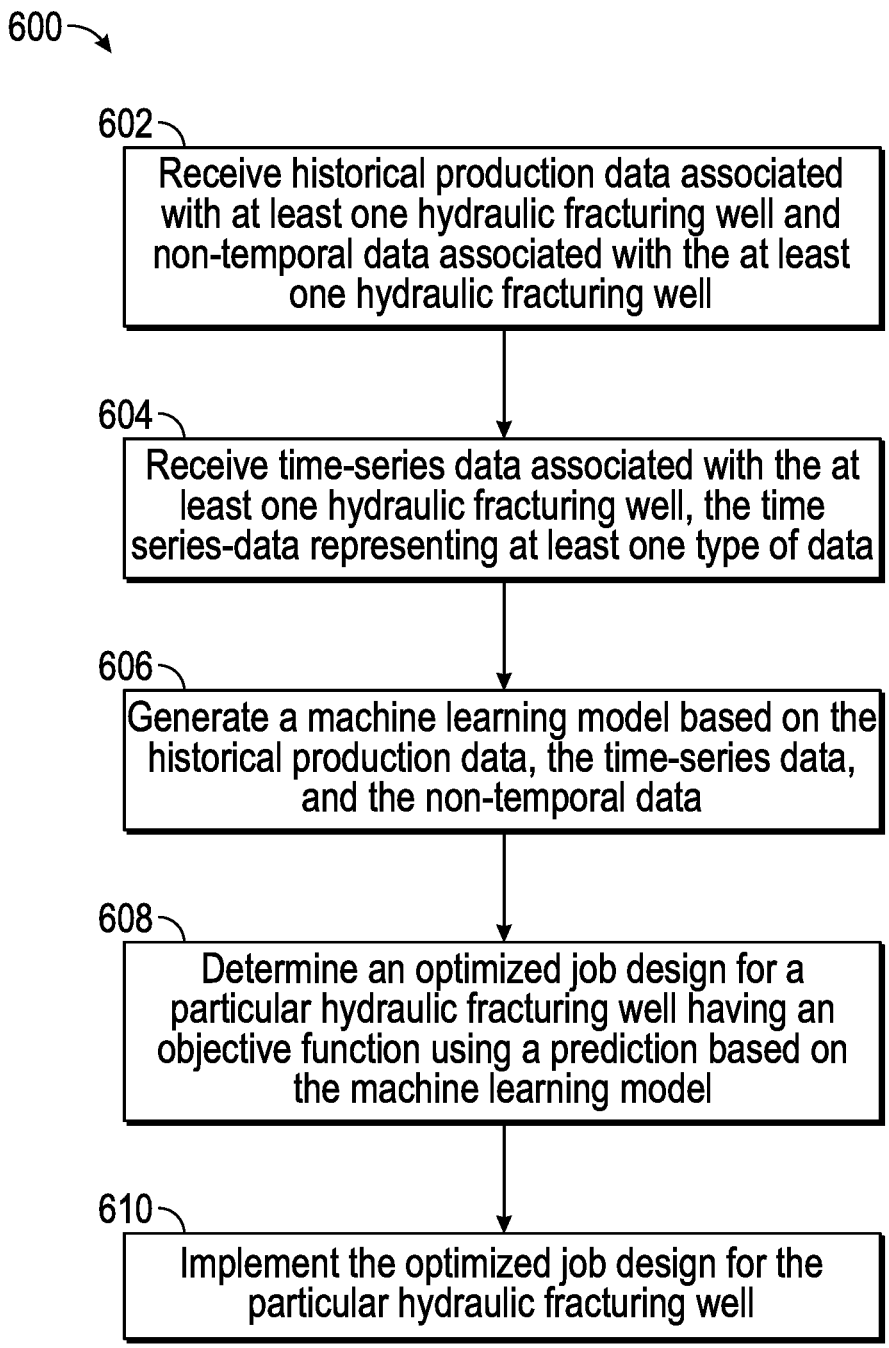
FIG. 6 is a flowchart of an example method for optimizing a fracture job design, in accordance with some examples.

FIG. 5 shows graphs associated with hydraulic fracturing job designs according to an example. As an example, graph 502 shows a representation of an original job design for a hydraulic fracturing well. The graph 502 shows three different lines or curves including one line or curve 508 that represents proppant concentration in pounds of proppant per gallon over time, one line or curve 510 that represents pressure in psi over time, and one line or curve 512 that represents slurry rate in bpm over time. The original job design requests 452,000 pounds of proppant, 355,000 gallons of fluid, a maximum rate of 80 bpm, and a maximum proppant concentration of 4.4 ppg.

The original job design for a well does not usually have variations from one stage to another. As a result, the original job design may remain the same from stage-to-stage for the well. The original job design may remain the same in stage two, stage three, and beyond until the last stage of the well. However, graphs 504 and 506 generated by the hydraulic fracturing job optimization system 201 represent different and more optimal job designs that present a number of modifications for subsequent stages beyond stage one.

Graph 504 shows a representation of a first new design selected by the real-time design optimization model that uses the machine learning model. The graph 504 also shows one line or curve 514 that represents proppant concentration in pounds of proppant per gallon over time, one line or curve 516 that represents pressure in psi over time, and one line or curve 518 that represents slurry rate in bpm over time. The first new design requests 440,000 pounds of proppant, 343,000 gallons of fluid, a maximum rate of 70 bpm, and a maximum proppant concentration of 2.25 ppg. As shown in graph 504, there is a step up for the proppant concentration and then a decline later in the stage. However, the step up shown in graph 504 is different and occurs at different times from the original design shown in graph 502.

Graph 506 shows a representation of a second new design selected by the real-time design optimization model that uses the machine learning model. The graph 506 also shows one line or curve 520 that represents proppant concentration in pounds of proppant per gallon over time, one line or curve 522 that represents pressure in psi over time, and one line or curve 524 that represents slurry rate in bpm over time. The second new design requests 419,000 pounds of proppant, 399,000 gallons of fluid, a maximum rate of 70 bpm, and a maximum proppant concentration of 2.0 ppg. As shown in graph 506, there is a gradual ramp up for the proppant concentration.

FIG. 6 illustrates an example method 600 for optimizing a fracture job design. For the sake of clarity, the method 600 is described in terms of the hydraulic fracturing job optimization system 201, as shown in FIG. 2, configured to practice the method. The steps outlined herein are exemplary and can be implemented in any combination thereof, including combinations that exclude, add, or modify certain steps.

At step 602, the hydraulic fracturing job optimization system 201 can receive historical production data associated with at least one hydraulic fracturing well. The historical data may be publicly available data and/or another type of data. In addition, the hydraulic fracturing job optimization system can receive non-temporal data associated with the at least one hydraulic fracturing well. As an example, the non-temporal data may be latitude and longitude, true vertical depth (TVD), measured depth (MD), reservoir information, and completion parameters, among other data.

At step 604, the hydraulic fracturing job optimization system 201 can receive time-series data associated with the at least one hydraulic fracturing well and including a particular hydraulic fracturing well. The time-series data from the particular hydraulic fracturing well may be based on an original executed job design for a job at the particular hydraulic fracturing well. The time-series data may represent at least one type of data including flow rate, proppant concentration, fluid concentration, chemical additive concentration, and pressure, among others. In addition, the time-series data may include at least one of surface pumping data, downhole pumping data, digital acoustic sensing (DAS) data, digital temperature sensing (DTS) data, and digital strain sensing (DSS) data, among others.

At step 606, the hydraulic fracturing job optimization system 201 can generate a machine learning model based on the historical production data, the time series data associated with the at least one hydraulic fracturing well, the time-series data based on an original job design during a first stage of the job, and the non-temporal data. In addition, the hydraulic fracturing job optimization system 201 may receive time-series pressure data associated with the first stage of the job at the particular hydraulic fracturing well and generate the machine learning model for the particular hydraulic fracturing well using the time-series pressure data. The machine learning model is used to predict an expected pressure response corresponding to implementation of the optimized job design, the expected pressure response serving as a KPI of well performance for the particular hydraulic fracturing well. In one example, the machine learning model for the particular hydraulic fracturing well may be generated using a Long Short Term Memory (LSTM) autoencoder for a time t=1 to t=n.

At step 608, the hydraulic fracturing job optimization system 201 can determine an optimized job design for the particular hydraulic fracturing well having an objective function using a prediction based on the machine learning model and optimization model. The objective function may include at least one of maximizing cumulative barrel of oil equivalent (BOE) for a first six months of production, maximizing cumulative oil production for a first nine months, minimizing cumulative water-oil ratio averaged over months three through nine, minimizing gas production decline rate in a first twelve months, minimizing gas-oil ratio (GOR) at twelve months, minimizing a job financial cost, maximizing a five-year well net present value (NPV), and maximizing a twelve month cumulative BOE per dollar of job cost, among others. In addition, the hydraulic fracturing job optimization system 201 can generate a graphical user interface that shows a first graph representing the optimized job design for the particular hydraulic fracturing well for the second stage of the job and a second graph representing the original job design for the particular hydraulic fracturing well for the second stage of the job.

At step 610, the hydraulic fracturing job optimization system 201 can implement the optimized job design for the particular hydraulic fracturing well. The optimized job design can be implemented at any time. In one example, the hydraulic fracturing job optimization system 201 can implement the optimized job design for a second stage of the job after the first stage of the job at the particular hydraulic fracturing well. After the second stage of the job, some portions of method 600 may repeat including using the machine learning model for the particular hydraulic fracturing well based on the historical production data, the time-series data associated with the at least one hydraulic fracturing well and based on the original job design, time-series data associated with a first stage of the job, time-series data associated with the second stage of the job, and the non-temporal data to determine an optimized job design for the particular hydraulic fracturing well for a third stage of the job. This optimization of the job design may continue for a fourth stage of the job and so on until the last stage for the well.

Having disclosed example systems, methods, and technologies for activating or triggering one or more downhole tools or memory devices based at least in part on one or more surface cues and sensed downhole activities, the disclosure now turns to FIG. 7, which illustrates an example computing device architecture 700 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

FIG. 7 illustrates an example computing device architecture 700 of a computing device which can implement the various technologies and techniques described herein. For example, the computing device architecture 700 can implement the system 201 shown in FIG. 2 and perform various steps, methods, and techniques disclosed herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (for example, microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "downhole," and "uphole," and the like, as used herein, shall mean in relation to the bottom or furthest extent of the surrounding wellbore even though the wellbore or portions of it may be deviated or horizontal. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method comprising receiving, by at least one processor, historical production data associated with at least one hydraulic fracturing well, receiving, by the at least one processor, time-series data based on an original job design for a job at a particular hydraulic fracturing well, the time-series data representing at least one type of data for the particular hydraulic fracturing well, receiving, by the at least one processor, non-temporal data associated with the at least one hydraulic fracturing well, generating, by the at least one processor, a machine learning model based on the historical production data, the time-series data based on the original job design during a first stage of the job at the particular hydraulic fracturing well, and the non-temporal data, determining, by the at least one processor, an optimized job design for the particular hydraulic fracturing well having an objective function using a prediction based on the machine learning model, and implementing, by the at least one processor, the optimized job design for the particular hydraulic fracturing well.

Statement 2: A method according to Statement 1, wherein the objective function comprises at least one of maximizing cumulative barrel of oil equivalent (BOE) for a first six months of production, maximizing cumulative oil production for a first nine months, minimizing cumulative water-oil ratio averaged over months three through nine, minimizing gas production decline rate in a first twelve months, minimizing gas-oil ratio (GOR) at twelve months, minimizing a job financial cost, maximizing a five-year well net present value (NPV), and maximizing a twelve month cumulative BOE per dollar of job cost.

Statement 3: A method according to any of Statements 1 and 2, wherein the optimized job design modifies at least one parameter for the job at the particular hydraulic fracturing well, the at least one parameter comprising a fracture fluid pump rate, a fluid type, a fluid volume per stage, proppant size, proppant mass per stage, maximum proppant concentration per stage, and proppant step rate or proppant ramp rate.

Statement 4: A method according to any of Statements 1 through 3, wherein the optimized job design constrains the at least one parameter for the job at the particular hydraulic fracturing well.

Statement 5: A method according to any of Statements 1 through 4, wherein the machine learning model is used to predict an expected pressure response corresponding to implementation of the optimized job design, the expected pressure response serving as a Key Performance Indicator (KPI) of well performance for the particular hydraulic fracturing well.

Statement 6: A method according to any of Statements 1 through 5, further comprising generating the machine learning model for the particular hydraulic fracturing well using a Long Short Term Memory (LSTM) autoencoder for a time t=1 to t=n.

Statement 7: A method according to any of Statements 1 through 6, wherein the time-series data comprises at least one of surface pumping data, downhole pumping data, digital acoustic sensing (DAS) data, digital temperature sensing (DTS) data, and digital strain sensing (DSS) data.

Statement 8: A method according to any of Statements 1 through 7, further comprising implementing the optimized job design for the particular hydraulic fracturing well for a second stage of the job after the first stage of the job at the particular hydraulic fracturing well.

Statement 9: A method according to any of Statements 1 through 8, wherein the at least one type of data comprises at least one of flow rate, proppant concentration, fluid concentration, chemical additive concentration, and pressure.

Statement 10: A system comprising, at least one processor coupled with at least one computer-readable storage medium having stored therein instructions which, when executed by the at least one processor, causes the system to: receive historical production data associated with at least one hydraulic fracturing well, receive time-series data based on an original job design for a job at a particular hydraulic fracturing well, the time-series data representing at least one type of data for the particular hydraulic fracturing well, receive non-temporal data associated with the at least one hydraulic fracturing well, generate a machine learning model for the particular hydraulic fracturing well based on the historical production data, the time-series data based on the original job design during a first stage of the job at the particular hydraulic fracturing well, and the non-temporal data, determine an optimized job design for the particular hydraulic fracturing well having an objective function using a prediction based on the machine learning model, and implement the optimized job design for the particular hydraulic fracturing well.

Statement 11: A system according to Statement 10, wherein the objective function comprises at least one of maximizing cumulative barrel of oil equivalent (BOE) for a first six months of production, maximizing cumulative oil production for a first nine months, minimizing cumulative water-oil ratio averaged over months three through nine, minimizing gas production decline rate in a first twelve months, minimizing gas-oil ratio (GOR) at twelve months, minimizing a job financial cost, maximizing a five-year well net present value (NPV), and maximizing a twelve month cumulative BOE per dollar of job cost.

Statement 12: A system according to any of Statements 10 and 11, wherein the optimized job design modifies at least one parameter for the job at the particular hydraulic fracturing well, the at least one parameter comprising a fracture fluid pump rate, a fluid type, a fluid volume per stage, proppant size, proppant mass per stage, maximum proppant concentration per stage, and proppant step rate or proppant ramp rate.

Statement 13: A system according to any of Statements 10 through 12, wherein the optimized job design constrains the at least one parameter for the job at the particular hydraulic fracturing well.

Statement 14: A system according to any of Statements 10 through 13, wherein the machine learning model is used to predict an expected pressure response corresponding to implementation of the optimized job design, the expected pressure response serving as a Key Performance Indicator (KPI) of well performance for the particular hydraulic fracturing well.

Statement 15: A system according to any of Statements 10 through 14, the at least one processor further to execute instructions to generate the machine learning model for the particular hydraulic fracturing well using a Long Short Term Memory (LSTM) autoencoder for a time t=1 to t=n.

Statement 16: A system according to any of Statements 10 through 15, wherein the time-series data comprises at least one of surface pumping data, downhole pumping data, digital acoustic sensing (DAS) data, digital temperature sensing (DTS) data, and digital strain sensing (DSS) data.

Statement 17: A system according to any of Statements 10 through 16, the at least one processor further to execute instructions to implement the optimized job design for the particular hydraulic fracturing well for a second stage of the job after the first stage of the job at the particular hydraulic fracturing well.

Statement 18: A system according to any of Statements 10 through 17, wherein the at least one type of data comprises at least one of flow rate, proppant concentration, fluid concentration, chemical additive concentration, and pressure.

Statement 19: A non-transitory computer-readable storage medium comprising instructions stored on the non-transitory computer-readable storage medium, the instructions, when executed by one more processors, cause the one or more processors to perform operations including: receiving historical production data associated with at least one hydraulic fracturing well, receiving time-series data based on an original job design for a job at a particular hydraulic fracturing well, the time-series data representing at least one type of data for the particular hydraulic fracturing well, receiving non-temporal data associated with the at least one hydraulic fracturing well, generating a machine learning model based on the historical production data, the time-series data based on the original job design during a first stage of the job at the particular hydraulic fracturing well, and the non-temporal data, determining an optimized job design for the particular hydraulic fracturing well having an objective function using a prediction based on the machine learning model, and implementing the optimized job design for the particular hydraulic fracturing well.

Statement 20: A non-transitory computer-readable storage medium according to Statement 19, the operations further comprising implementing the optimized job design for the particular hydraulic fracturing well for a second stage of the job after the first stage of the job at the particular hydraulic fracturing well.

Statement 21: A system comprising means for performing a method according to any of Statements 1 through 9.

We claim:

1. A method comprising:
    receiving, by at least one processor, historical production data associated with at least one hydraulic fracturing well;
    receiving, by the at least one processor, time-series data associated with the at least one hydraulic fracturing well and based on an original job design for a job at a particular hydraulic fracturing well, the time-series data representing at least one type of data;
    receiving, by the at least one processor, non-temporal data associated with the at least one hydraulic fracturing well;

encoding the time-series data into encoded time-series data;

generating, by the at least one processor, a machine learning model based on the historical production data, the encoded time-series data, and the non-temporal data, wherein the machine learning model is configured to predict a Key Performance Indicator (KPI) of well performance for the particular hydraulic fracturing well;

passing candidate job designs into the machine learning model to generate outputs, wherein each of the candidate job designs modify at least one parameter for the job;

determining, by the at least one processor and an optimization model configured to receive the outputs generated by the machine learning model as inputs, an optimized job design for the particular hydraulic fracturing well having an objective function using a prediction based on the machine learning model, wherein the optimized job design is optimized based on the KPI, and wherein the optimized job design is one of the candidate job designs; and implementing, by the at least one processor, the optimized job design for the particular hydraulic fracturing well.

2. The method of claim 1, wherein the objective function comprises at least one of maximizing cumulative barrel of oil equivalent (BOE) for a first six months of production, maximizing cumulative oil production for a first nine months, minimizing cumulative water-oil ratio averaged over months three through nine, minimizing gas production decline rate in a first twelve months, minimizing gas-oil ratio (GOR) at twelve months, minimizing a job financial cost, maximizing a five-year well net present value (NPV), and maximizing a twelve month cumulative BOE per dollar of job cost.

3. The method of claim 1, wherein the optimized job design modifies at least one parameter for the job at the particular hydraulic fracturing well, the at least one parameter comprising a fracture fluid pump rate, a fluid type, a fluid volume per stage, proppant size, proppant mass per stage, maximum proppant concentration per stage, and proppant step rate or proppant ramp rate.

4. The method of claim 3, wherein the optimized job design constrains the at least one parameter for the job at the particular hydraulic fracturing well.

5. The method of claim 1, wherein the machine learning model is used to predict an expected pressure response corresponding to implementation of the optimized job design, the expected pressure response serving as the KPI of well performance for the particular hydraulic fracturing well.

6. The method of claim 1, further comprising generating the machine learning model for the particular hydraulic fracturing well using a Long Short Term Memory (LSTM) encoder model for a time t=1 to t=n.

7. The method of claim 1, wherein the time-series data comprises at least one of surface pumping data, downhole pumping data, digital acoustic sensing (DAS) data, digital temperature sensing (DTS) data, and digital strain sensing (DSS) data.

8. The method of claim 1, further comprising implementing the optimized job design for the particular hydraulic fracturing well for a second stage of the job after the first stage of the job at the particular hydraulic fracturing well.

9. The method of claim 1, wherein the at least one type of data comprises at least one of flow rate, proppant concentration, fluid concentration, chemical additive concentration, and pressure.

10. A system comprising:
at least one processor coupled with at least one computer-readable storage medium having stored therein instructions which, when executed by the at least one processor, causes the system to:
receive historical production data associated with at least one hydraulic fracturing well;
receive time-series data associated with the at least one hydraulic fracturing well and based on an original job design for a job at a particular hydraulic fracturing well, the time-series data representing at least one type of data;
receive non-temporal data associated with the at least one hydraulic fracturing well;
encode the time-series data into encoded time-series data;
generate a machine learning model based on the historical production data, the encoded time-series data, and the non-temporal data, wherein the machine learning model is configured to predict a Key Performance Indicator (KPI) of well performance for the particular hydraulic fracturing well;
passing candidate job designs into the machine learning to generate outputs, wherein each of the candidate job designs modify at least one parameter for the job;
determine an optimized job design for the particular hydraulic fracturing well by an optimization model configured to receive the outputs generated by the machine learning model as an input, wherein the optimized job design is optimized based on the KPI, and wherein the optimized job design is one of the candidate job designs; and
facilitate implementing the optimized job design for the particular hydraulic fracturing well.

11. The system of claim 10, wherein the objective function comprises at least one of maximizing cumulative barrel of oil equivalent (BOE) for a first six months of production, maximizing cumulative oil production for a first nine months, minimizing cumulative water-oil ratio averaged over months three through nine, minimizing gas production decline rate in a first twelve months, minimizing gas-oil ratio (GOR) at twelve months, minimizing a job financial cost, maximizing a five-year well net present value (NPV), and maximizing a twelve month cumulative BOE per dollar of job cost.

12. The system of claim 10, wherein the optimized job design modifies at least one parameter for the job at the particular hydraulic fracturing well, the at least one parameter comprising a fracture fluid pump rate, a fluid type, a fluid volume per stage, proppant size, proppant mass per stage, maximum proppant concentration per stage, and proppant step rate or proppant ramp rate.

13. The system of claim 12, wherein the optimized job design constrains the at least one parameter for the job at the particular hydraulic fracturing well.

14. The system of claim 10, wherein the machine learning model is used to predict an expected pressure response corresponding to implementation of the optimized job design, the expected pressure response serving as the KPI of well performance for the particular hydraulic fracturing well.

15. The system of claim 10, the at least one processor further to execute instructions to generate the machine learning model for the particular hydraulic fracturing well using a Long Short Term Memory (LSTM) encoder model for a time t=1 to t=n.

16. The system of claim 10, wherein the time-series data comprises at least one of surface pumping data, downhole pumping data, digital acoustic sensing (DAS) data, digital temperature sensing (DTS) data, and digital strain sensing (DSS) data.

17. The system of claim 10, the at least one processor further to execute instructions to implement the optimized job design for the particular hydraulic fracturing well for a second stage of the job after the first stage of the job at the particular hydraulic fracturing well.

18. The system of claim 10, wherein the at least one type of data comprises at least one of flow rate, proppant concentration, fluid concentration, chemical additive concentration, and pressure.

19. A non-transitory computer-readable medium having instructions stored thereon that, when executed by at least one processor, cause the at least one processor to perform operations comprising:
   receiving historical production data associated with at least one hydraulic fracturing well;
   receiving time-series data associated with the at least one hydraulic fracturing well and based on an original job design for a job at a particular hydraulic fracturing well, the time-series data representing at least one type of data;
   receiving non-temporal data associated with the at least one hydraulic fracturing well;
   encoding the time-series data into encoded time-series data;
   generating a machine learning model based on the historical production data, the encoded time-series data, and the non-temporal data, wherein the machine learning model is configured to predict a Key Performance Indicator (KPI) of well performance for the particular hydraulic fracturing well;
   passing candidate job designs into the machine learning model to generate outputs, wherein each of the candidate job designs modify at least one parameter for the job;
   determining an optimized job design for the particular hydraulic fracturing well having an objective function using a prediction based on the machine learning model by an optimization model configured to receive the outputs generated by the machine learning model as an input, wherein the optimized job design is optimized based on the KPI and wherein the optimized job design is one of the candidate job designs; and
   facilitate implementing the optimized job design for the particular hydraulic fracturing well.

20. The non-transitory computer-readable medium of claim 19, the operations further comprising implementing the optimized job design for the particular hydraulic fracturing well for a second stage of the job after the first stage of the job at the particular hydraulic fracturing well.

* * * * *